Dec. 2, 1958 G. M. KOVAC 2,862,516
MATERIAL TRANSFER TURNTABLE
Filed Jan. 30, 1956
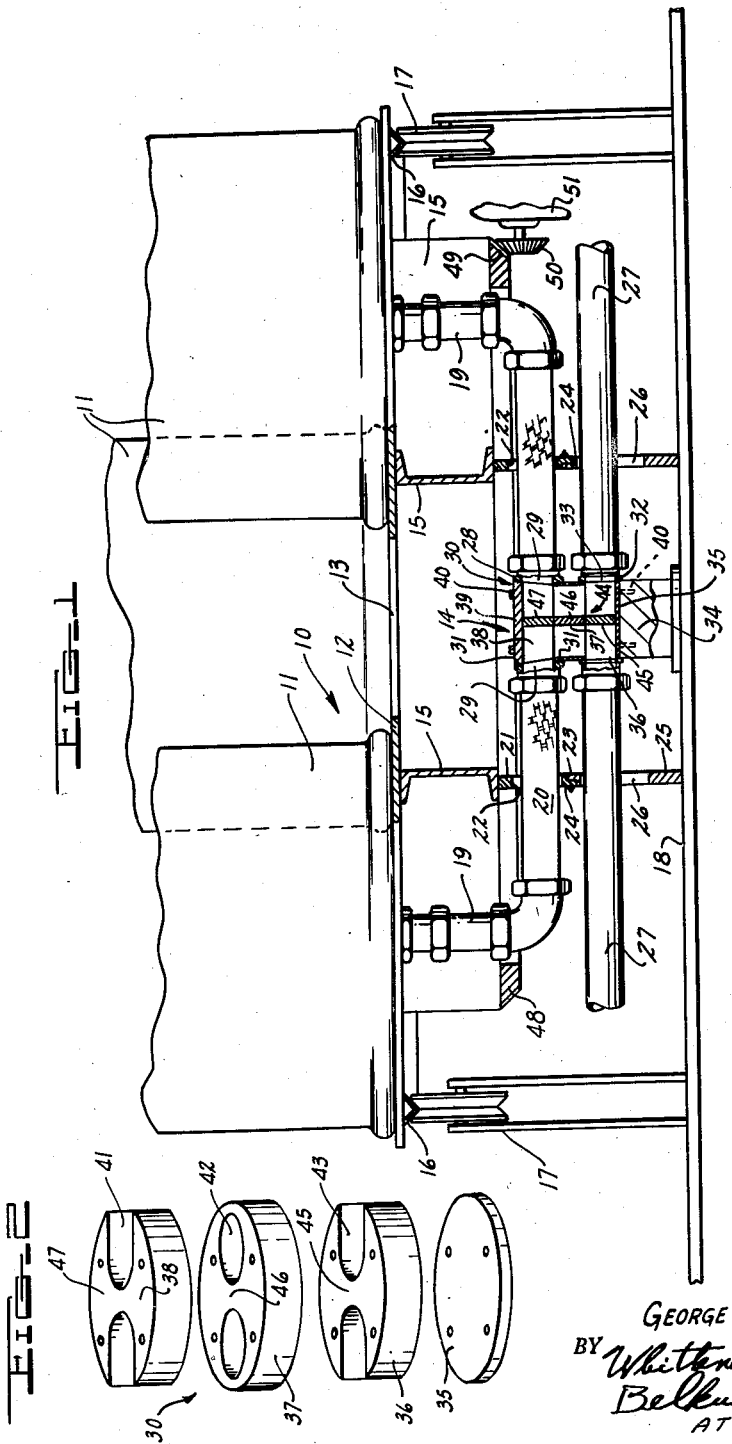
INVENTOR.
GEORGE M. KOVAC
BY
ATTORNEYS

United States Patent Office 2,862,516
Patented Dec. 2, 1958

2,862,516
MATERIAL TRANSFER TURNTABLE

George M. Kovac, Lincolnwood, Ill., assignor to Ren Plastics, Inc., Lansing, Mich., a corporation of Michigan Application January 30, 1956, Serial No. 562,124

10 Claims. (Cl. 137—257)

The present invention relates to an improved transfer device or indexing turntable for moving containers of plastic or flowable materials between successive stations during a material handling operation, for example a station at which a container receives a mass of material and a station at which the material is discharged from the container by pumping, ram action or the like. Although the invention is widely adaptable to operations involving the handling of compositions or materials in a wide range of viscosities or relative flowabilities, i. e. from practically liquid consistency to zero flow characteristic, the improved turntable unit was particularly devised for use in a method and equipment for formulating plastic resin compound which is the subject of an application for Letters Patent of H. J. Renaud and G. M. Kovac, Serial No. 562,120, filed January 30, 1956. Reference to the Renaud and Kovac application will afford an illustration of the advantages of the present construction in an industrial installation having wide utility and practicality.

It is an object of the invention to provide a transfer device of the rotatably indexing turntable type for periodically transferring unit containers borne thereby past successive operating stations at which, in accordance with the illustrated embodiment of the invention, it is desired to first fill and then empty the container. With this object in mind, and simply as an example of a practical application, the turntable may serve as a support for, say, four containers spaced equally in a circumferential sense, two of which are to be filled while the other two are being emptied. Each container is equipped with a discharge fitting communicating with its interior, and it is a more specific object of the invention to provide an improved valving arrangement by which the need for manually coupling and decoupling the discharge fittings between successive indexing movements, in reference to a discharge pump or other receiver, for example, is eliminated. This will be the situation in the case of the transfer structure as it would be employed in an installation such as is shown in the identified copending Renaud et al. application. Other applications of the principle of the invention will occur to those skilled in the art.

It is a further and still more specific object to provide a turntable as described in which the container discharge fittings are coupled and decoupled automatically by means of an improved, fixed core valve assembly which places the respective containers successively in and out of material flow communication with a pump or like agency, by which the contents of one container are emptied therefrom and forwarded to a receiver. This may be in the form of a unit performing some operation on the transferred material, or a receiver collecting material for a further operation, such as packaging, entirely independent of the material processing operations preceding it.

In accordance with the invention, the container discharge fittings rotate with the containers on the turntable, in fixed relation to the latter, while pump intake lines are mounted in fixed relation to a support on which the turntable is mounted for rotary indexing movement. A valve unit is mounted coaxially of and below the turntable, this valve unit comprising a composite core made up of a fixed upper partition valve block, with which the container discharge fittings are associated for relatively sliding sealed engagement, so as to successively come in communication with opposed passages in the valve block and to be cut off from communication with those passages as the fitting discharge ends rotate on the core; an intermediate valve block also partitioned to subdivide the same into passages which are in alignment with the respective opposed passages of the upper valve block, and a lower valve block similarly partitioned to constitute passages communicating with the respective passages of the other blocks. The passages of the lower valve core block are in continuous fixed communication with the intake lines of pumps or other material forwarding devices, and it will be appreciated that the pump intakes are automatically cut off during rotation of the turntable, as the container discharge fittings are taken out of communication with the internal passages of the valve core upon commencement of rotation of the turntable.

It is a general object of the invention to provide a material transfer turntable unit of the foregoing description, which will successfully handle plastic materials of practically any degree of viscosity, such as will either permit gravitational flow of the material to a pump (or to a simple receiver in the event it is not desired or necessary to force-feed the material), or of a condition of extremely high, zero flowability viscosity, such as requires supplementation of the action of the pump by positive ram force applied to the material remote from the pump intake.

A still further object is to provide a turntable structure featuring automatic valve provisions as described which are readily accessible for cleaning, servicing, and the like.

The foregoing as well as other objects of the invention will become more apparent as this description proceeds, especially in connection with the accompanying drawings, wherein Fig. 1 is a fragmentary view in vertical section through a rotatively indexing turntable structure and a composite automatic valve unit associated therewith in accordance with the invention; and Fig. 2 is an exploded perspective view showing more or less schematically the component core parts of the valve unit appearing in Fig. 1.

As illustrated in Figs. 1 and 2, the reference numeral 10 generally designates a rotatively indexable turntable which may be periodically indexed from angularly spaced stations (not shown) at which certain operations are performed in relation to plasticly flowable material, usually of a liquid or moist character, in upstanding drum-like containers 11 which are arranged in angularly spaced relation on an upper table plate 12 of the turntable 10, in symmetrically spaced, radially outward relation to a central aperture 13 in the table plate 12. In the unit actually shown there are four of the containers 11 in pairs positioned in diametrically opposed relation to one another, which will be controlled as to the transfer or shifting of the contents of the containers by the relatively simple automatic valve unit, generally designated 14 and hereinafter described in detail. However, it will be appreciated that more complex, but not essentially differing, valve structures will handle a greater number of containers on the turntable 10, as desired or required by the particular installation.

The turntable 10 is well braced at its bottom by the channel beam members 15, or equivalents thereof, and a continuous circular track 16 is carried by the turntable 10, to be engaged by a circumferentially arranged, upwardly extending series of track rollers 17, rigidly supported on an appropriate base 18 for the turntable unit 10. The track rollers 17 are arranged sufficiently outwardly, in relation to the turntable 10 and associated structure, to avoid interference with depending parts and connections carried by the turntable for rotation therewith.

Each container 11 is equipped with an angled discharge fitting 19, constituted by nipples, ells and the like, which fitting is connected by a flexible armored conduit 20 with the automatic valve unit 14. As illustrated in Fig. 1, the table 10 has a depending annular guide ring 21 welded to its channel braces 15, and ring 21 is provided with radial openings 22 which accommodate the connecting conduits 20 of the respective fittings 19.

The guide ring 21 has an annular internal rabbet 23 around its lower edge which has accurately designed radial sliding engagement with the external rabbeted surface 24 of a fixed bottom guide ring 25 rigidly welded to the base 18. Guide ring 25 is provided with radial apertures 26, which accommodate fixed piping such as the conduits or lines 27. These may lead to the intake side of pumps of one sort or another capable of handling the materials to be transferred or moved, either with or without further ram or like assistance of the sort mentioned in the copending Renaud and Kovac application referred to. Alternatively, the lines 27 may simply be gravity flow conduits to or from a liquid container, particularly in the case discharge pumping is not required.

The radially inner extremities of the container fitting discharge conduits 20 are coupled in sealed relation to an annular valve ring 28 which has diametrically opposed ports 29 through which the conduits are communicated with a fixed valve core, generally designated 30, of the automatic valve unit 14. Leakage is prevented by the interpositioning of an O-ring 31 between the valve ring 28 and upper and intermediate block parts of the valve core 30, to be described. The pump intake conduits 27 are in rigidly fixed communication with the interior valve unit 30, as through an annular fitting 32 having diametrically opposed passages 33.

The valve core 30 is a composite one. It includes a bottom mounting block 34 which is welded or otherwise secured on turntable base 18 concentrically of the turntable plate 12 and its central aperture 13; a bottom closure disk 35 immediately above block 34; a bottom valve core block 36, partitioned (as are the other block parts) in a manner to be described; an intermediate core block 37; and upper core block 38, and a top closure plate or disk 39. The parts 34, 35, 36, 37, 38 and 39 are rigidly connected as a fixed unit carried by base 18 by means of four elongated studs 40 threaded downwardly into the mounting block 34. The O-rings 31 are interposed between the rotating valve ring 28 and the top plate 30 and intermediate valve core block 37, respectively, these being the only zones at which rotative sealing action is required. Other types of seal may of course be employed.

As illustrated in Fig. 2 of the drawings, the top valve core block 38 is in the form of a fairly thick circular disk which is machined axially in diametrically opposed zones to provide valve passages 41 paralleling the axis of the core 30 and valve unit 14. The passages extend radially outwardly through the perimeter of the disk 38, and throughout the remainder of its perimeter the disk 38 will have relatively rotative sliding engagement with the inner surface of the rotatable valve ring 28, to control communication of its ports 29 with the valve interior. The intermediate valve core block 37 is also in the form of a circular disk of substantial thickness, but in this case the disk is provided with valve ports 42 paralleling its central axis and equally spaced diametrically on opposite sides thereof, yet within the outer circumference of the disk. The lower valve core block 36 is a duplicate of the upper block 38, its valve passages 43 extending through its outer perimeter, and the bottom disk 35 is of the same diameter as the blocks which it is associated with.

As illustrated in Fig. 1, the various core blocks are assembled with their respective, diametrically opposed valve passages 41, 42, 43 in vertical alignment for unimpeded flow communication therethrough. With this arrangement, the core is vertically subdivided by a partition structure 44 including partitions 45, 46 and 47 radially separating the respective valve passages of the core blocks 36, 37 and 38. These passages thus open radially outwardly at axially spaced upper and lower zones to the rotating conduits 20 and to the fixed, pump-connected conduits 27, respectively, the latter conduits being located beneath the rotative support for the turntable on the fixedly mounted track rollers 17.

Any appropriate provisions may be made for periodically indexing the turntable 10, and the invention is not particularly concerned with their nature. As illustrated in Fig. 1, a spider ring 48 provided with external bevel gear teeth 49 may be rigidly secured to the table structure, the teeth 49 being meshingly engaged by a bevel pinion 50 on the shaft of an appropriately controlled driver 51 such as a geared down electric motor. Energization of the motor will be periodically controlled through an appropriate switching arrangement.

In the operation of the turntable 10, its periodic indexing movements cause the valve ring 28 to bring the rotating upper conduit connectors 20 successively into communication with the aligned passages 41, 42, 43 of its core structure 30, at the termination of the rotative increment of movement, and to interrupt the communication upon reinstitution of the movement.

When the turntable is at rest one pair of containers 11 is in communication through the valve porting 41, 42, 43 with the fixed lower conduits or lines 27 while the other pair is blocked off, as for an operation of filling those containers.

The fixed core valve unit permits indexing of the turntable without interference of the container discharge lines with fixedly mounted parts or other lines. The same is true of the track roller arrangement 17. The need to periodically hook up and unhook the flow lines is eliminated and the generously ported valve core 30 permits the handling, gravitationally or by force feed of materials of practically any viscosity.

The composite structure of valve unit 30, as held together by studs 40, greatly facilitates its internal inspection, cleaning, and possible replacement of parts. But a moment's work is required to dismantle the same, as well as to re-install the same. Moreover, the machining of the parts is a relatively simple matter.

Although shown as servicing four containers, it is evident that more or fewer units can be serviced by appropriate changes in the valving.

What I claim as my invention is:

1. In combination a rotatively indexable turntable having a plurality of containers mounted thereon in equally spaced circumferential relation, each of said containers being provided with a material flow conduit opening to its exterior, and an automatic valve unit periodically permitting and preventing flow in said conduits, comprising a fixed, generally cylindrical valve core coaxial with the path of rotation of said containers, said core including axially spaced parts having axially extending valve passages on opposite sides of the core axis which open radially outwardly of the core, and an intermediate part between said parts provided with axially extending passages within its circumference which communicate with the respective passages of said other parts, a valve ring slidingly engaging said core and periodically communicating said conduits with said respective opposed valve passages of one of said first named parts, and a further valve member in fixed relation to said core and having ports communicating with said valve passages of said intermediate part.

2. In combination a rotatively indexable turntable having a plurality of containers mounted thereon in equally spaced circumferential relation, each of said containers being provided with a material flow conduit opening to its exterior, and an automatic valve unit periodically permitting and preventing flow in said conduits, comprising a fixed, generally cylindrical valve core coaxial with the path of rotation of said containers, said core including axially spaced parts having axially extending valve passages on opposite sides of the core axis which open radially outwardly of the core, and an intermediate part between said parts provided with axially extending passages within its circumference which communicate with the respective passages of said other parts, a valve ring slidingly engaging said core and periodically communicating said conduits with said respective opposed valve passages of one of said first named parts, a further valve member in fixed relation to said core and having ports communicating with said valve passages of said intermediate part, and means removably holding said parts in coaxial relation with their respective passages in axial communication.

3. A turntable device suitable for rotatively moving a container or like member to different positions, comprising a movable support, means to impart rotative movement thereto, said support carrying a material flow conduit for movement therewith, and a valve unit automatically controlling material in said conduit, to permit and prevent its flow in different positions of the support, said unit comprising a fixed valve core provided with at least one passage therein having openings to the exterior thereof at spaced points, said core being radially sealed from said exterior between said openings, a valve member on said conduit in rotatively sliding engagement with said core and alternating connecting and disconnecting flow communication of said conduit with one of said passage openings, and a further conduit in fixed communication with said passage at another opening thereof, said passage of said core paralleling the axis of rotation of the support and said openings extending radially outwardly of the core to said valve member and to said further conduit, respectively, said core comprising upper and lower coaxial core parts each having a radially opening passage portion, and an intermediate coaxial core part provided with an internal passage portion aligned with said other passage portions.

4. A turntable device suitable for rotatively moving a container or like member to different positions, comprising a movable support, means to impart rotative movement thereto, said support carrying a material flow conduit for movement therewith, and a valve unit automatically controlling material in said conduit, to permit and prevent its flow in different positions of the support, said unit comprising a fixed valve core provided with at least one passage therein having openings to the exterior thereof at spaced points, said core being radially sealed from said exterior between said openings, a valve member on said conduit in rotatively sliding engagement with said core and alternating connecting and disconnecting flow communication of said conduit with one of said passage openings, and a further conduit in fixed communication with said passage at another opening thereof, said passage of said core paralleling the axis of rotation of the support and said openings extending radially outwardly of the core to said valve member and to said further conduit, respectively, said core comprising upper and lower coaxial core parts each having a radially opening passage portion, and an intermediate coaxial core part provided with an internal passage portion aligned with said other passage portions, and means releasably securing said core parts in said relation.

5. A turntable device suitable for rotatively moving a container or like member to different positions, comprising a movable support, means to impart rotative movement thereto, said support carrying a material flow conduit for movement therewith, and a valve unit automatically controlling material in said conduit, to permit and prevent its flow in different positions of the support, said unit comprising a fixed valve core of circular cross section provided with at least one passage therein having axially spaced openings exposed radially in a common direction and in parallel planes to the peripheral exterior thereof at axially spaced points, said core being radially sealed from said exterior between said openings, a valve member on said conduit in rotatively sliding engagement with said core and alternating connecting and disconnecting flow communication of said conduit with one of said passage openings, and a further conduit in fixed communication with said passage at another opening thereof.

6. A turntable device suitable for rotatively moving a container or like member to different positions, comprising a movable support, means to impart rotative movement thereto, said support carrying a material flow conduit for rotative movement therewith, and a valve unit automatically controlling material in said conduit to permit and prevent its flow in different positions of the support, said unit comprising a fixed valve core of circular cross section disposed on an upright axis and provided with at least one axially extending passage therein having radial openings exposed in parallel planes to the peripheral exterior thereof at axially spaced points, said core being radially sealed from said exterior between said openings, a rotatable valve member on said conduit in rotatively sliding engagement with said core and alternating connecting and disconnecting flow communication of said conduit with the axially uppermost of said passage openings, and a further conduit in fixed communication with said passage at the lowermost opening thereof.

7. A device in accordance with claim 6, in which there are at least two of said passages in said core parallel to the axis of rotation of the support and in which said openings of the respective passages extend radially outwardly of the core with the openings of the respective passages in common vertical planes.

8. In combination, a rotative turntable having a plurality of containers fixedly mounted thereon in equally spaced circumferential relation, a support mounting said turntable for rotation in a predetermined plane, each of said containers being provided with a material flow conduit rotating therewith and opening to its exterior, and an automatic valve unit periodically permitting and preventing flow in said conduits, comprising a fixed, generally cylindrical valve core coaxial with the axis of rotation of said containers, said core having axially extending valve passages on opposite sides of the core axis each of which opens radially outwardly to the peripheral exterior of the core at axially spaced points thereon, said core being radially sealed from said exterior between said passages, a valve ring rotatively and slidingly engaging said core and periodically communicating said conduits with said respective opposed valve passages at one of said axially spaced points, and a further fixed valve device in fixed relation to said core and having ports communicating with said valve passages at the other axial point.

9. The combination in accordance with claim 8, in which the plane of rotation of said turntable is horizontal and in which said fixed valve device has a fixed conduit connected thereto; and in which said support comprises circular track means supporting said turntable above said fixed conduit.

10. The combination in accordance with claim 8, in which the plane of rotation of said turntable is horizontal, and in which said fixed valve device has a fixed conduit connected thereto; and in which said support comprises fixedly mounted and upwardly facing, circumferentially arranged track rollers above said fixed conduit, and a circular track on said turntable riding said rollers.

References Cited in the file of this patent
UNITED STATES PATENTS

| | | |
|---|---|---|
| 1,185,532 | Pfouts | May 30, 1916 |
| 1,300,869 | Pitts | Apr. 15, 1919 |
| 1,546,552 | Pfouts | July 21, 1925 |
| 1,749,257 | Mortensen | Mar. 4, 1930 |